(12) United States Patent  (10) Patent No.: US 9,726,825 B2
Hung et al. (45) Date of Patent: Aug. 8, 2017

(54) OPTICAL COUPLING LENS AND OPTICAL FIBER COUPLING CONNECTOR

(71) Applicant: HON HAI PRECISION INDUSTRY CO., LTD., New Taipei (TW)

(72) Inventors: Yi Hung, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/344,593

(22) Filed: Nov. 7, 2016

(65) Prior Publication Data

US 2017/0052322 A1 Feb. 23, 2017

Related U.S. Application Data

(63) Continuation of application No. 14/575,236, filed on Dec. 18, 2014, now Pat. No. 9,519,116.

(30) Foreign Application Priority Data

Sep. 9, 2014 (TW) .............................. 103131060 A

(51) Int. Cl.
*G02B 6/42* (2006.01)
*H04B 10/40* (2013.01)
*G02B 6/32* (2006.01)

(52) U.S. Cl.
CPC ............. *G02B 6/32* (2013.01); *G02B 6/4206* (2013.01); *G02B 6/428* (2013.01); *G02B 6/4214* (2013.01); *G02B 6/4228* (2013.01); *G02B 6/4244* (2013.01); *G02B 6/4246* (2013.01); *H04B 10/40* (2013.01)

(58) Field of Classification Search
CPC .............................. G02B 6/42; G02B 6/4212
USPC ........................................................... 385/33
See application file for complete search history.

(56) References Cited

U.S. PATENT DOCUMENTS

| | | | | |
|---|---|---|---|---|
| 6,454,467 B1* | 9/2002 | Ishihara | ............... | G02B 6/4246 385/24 |
| 8,599,489 B2* | 12/2013 | Shalaev | ................ | B82Y 20/00 359/642 |
| 2008/0226228 A1* | 9/2008 | Tamura | ................ | G02B 6/4214 385/33 |
| 2010/0266241 A1* | 10/2010 | Hosoda | ................ | G02B 6/4201 385/49 |
| 2012/0263416 A1* | 10/2012 | Morioka | .............. | G02B 6/4214 385/33 |

(Continued)

*Primary Examiner* — Kaveh C Kianni
(74) *Attorney, Agent, or Firm* — Steven Reiss

(57) ABSTRACT

An optical fiber coupling connector includes a board, a light receiving device, two light emitting devices, a controller and an optical coupling lens. The optical coupling lens includes three main bodies, each includes a bottom surface, a top surface, an alignment surface, a first and a second side surface, a third side surface obliquely connected to the first side surface, and a fourth side surface obliquely connected to the second side surface and connected to the third side surface at a second edge. The alignment surface, the first side surface, the third side surface, the fourth side surface and the second side surface are connected to each other end to end in that order. The third side surface of each one of the main bodies contacts the fourth side surface of an adjacent one of the main bodies. At least three optical fibers positioned to the optical coupling lens.

6 Claims, 5 Drawing Sheets

(56) References Cited

U.S. PATENT DOCUMENTS

| | | | |
|---|---|---|---|
| 2013/0163924 A1* | 6/2013 | Lin | G02B 6/4214 385/33 |
| 2013/0259419 A1* | 10/2013 | Charbonneau-Lefort | G02B 6/4214 385/14 |
| 2013/0259423 A1* | 10/2013 | Charbonneau-Lefort | G02B 6/4206 385/33 |
| 2014/0064689 A1* | 3/2014 | Kuo | G02B 6/262 385/134 |
| 2014/0153872 A1* | 6/2014 | Lin | G02B 6/42 385/33 |
| 2014/0199030 A1* | 7/2014 | Lin | G02B 6/32 385/89 |
| 2014/0334785 A1* | 11/2014 | Harumoto | G02B 6/4204 385/93 |
| 2015/0036985 A1* | 2/2015 | Shibuya | G02B 6/4214 385/93 |
| 2015/0370020 A1* | 12/2015 | Engel | G02B 6/4214 385/33 |

* cited by examiner

OPTICAL COUPLING LENS AND OPTICAL FIBER COUPLING CONNECTOR

FIELD

This application is a divisional application of a commonly-assigned application entitled "OPTICAL COUPLING LENS AND OPTICAL FIBER COUPLING CONNECTOR", filed on Dec. 18, 2014 with application Ser. No. 14/575,236. The disclosure of the above-identified application is incorporated herein by reference.

The subject matter herein generally relates to data transmission.

BACKGROUND

In the field of fiber optical communication technologies, a fiber optical transceiver usually has a printed circuit board and an optical coupling lens, the electrical signal is used to control and process data and the optical signal is used to transmit data. However, the fiber optical transceiver cannot meet the requirements of the data transmission by using only one signal output.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the disclosure. Implementations of the present technology will now be described, by way of example only, with reference to the attached figure.

DETAILED DESCRIPTION

Figure 1:
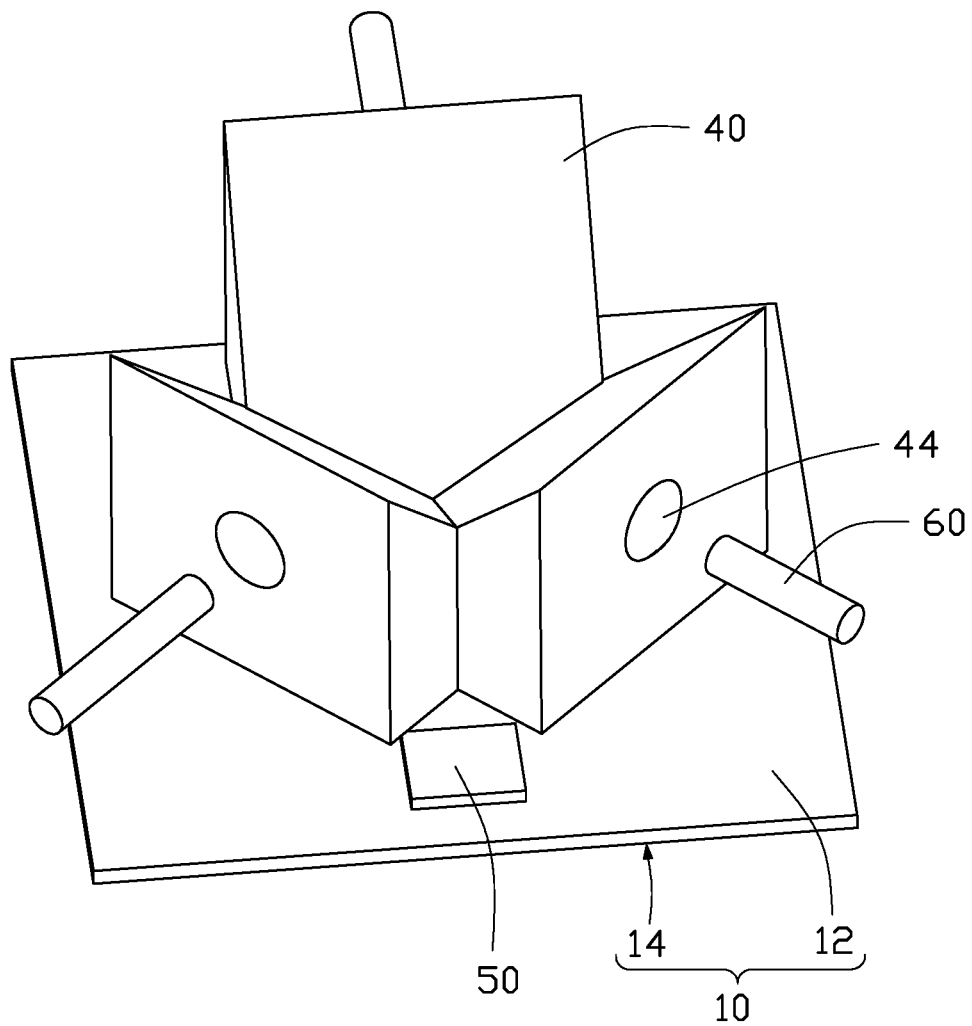
FIG. 1 is an isometric view of an optical fiber coupling connector, according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

Figure 2:
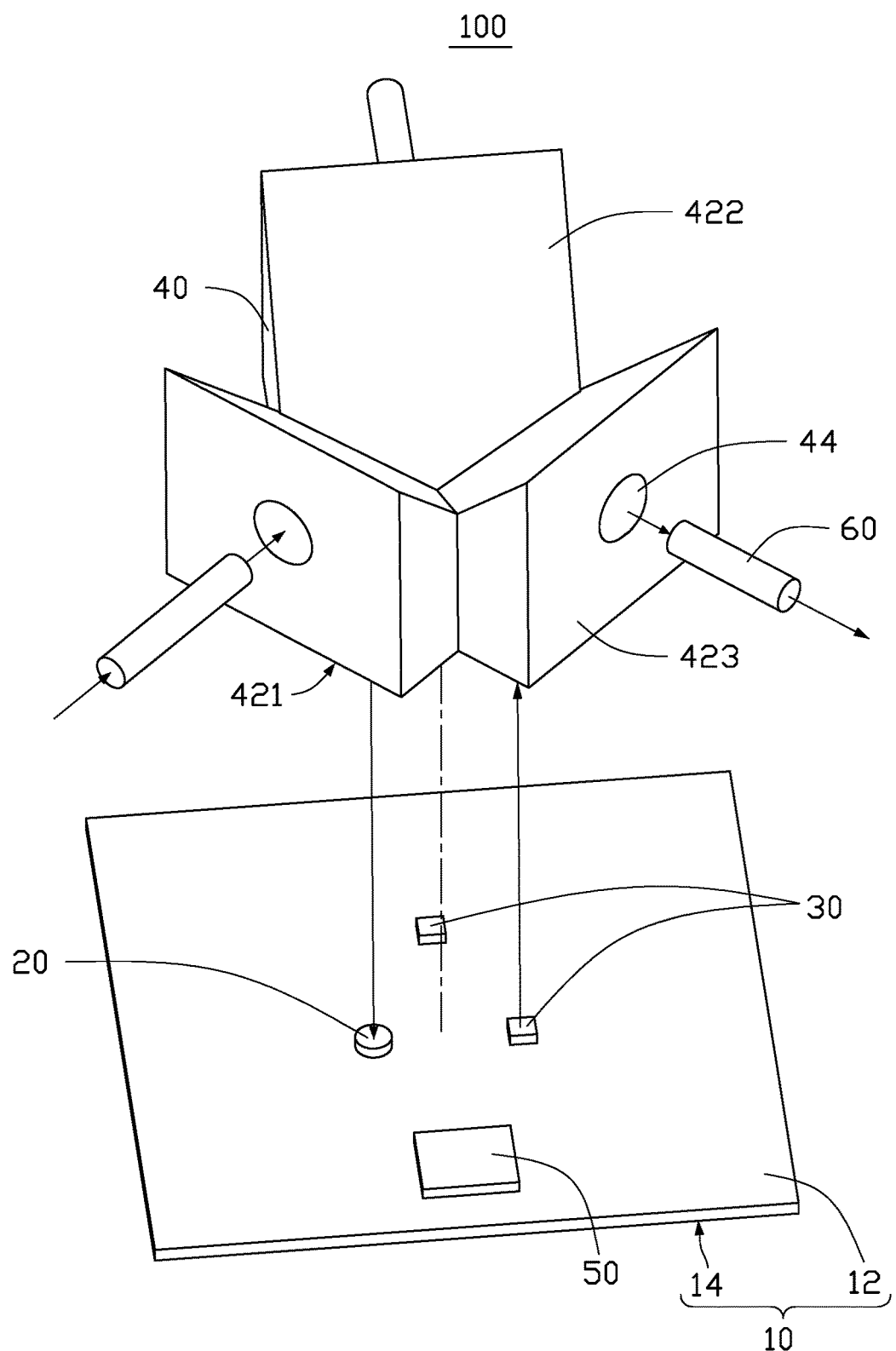
FIG. 2 is an isometric, exploded view of the optical fiber coupling connector in FIG. 1.

FIGS. 1 and 2 illustrate an embodiment of an optical fiber coupling connector 100. An optical fiber coupling connector 100 includes a board 10, a light receiving device 20, two light emitting devices 30, an optical coupling lens 40, a controller 50, and three optical fibers 60.

The board 10 includes a first surface 12, and a second surface 14 which is parallel and opposite to the first surface 12.

The light receiving device 20 and two light emitting devices 30 are positioned on the first surface 12 of the board 10 and electrically connected with the board 10. In the embodiment, the light receiving device 20 and two light emitting devices 30 are not positioned on the same line, the light receiving device 20 is configured to receive optical signals and converts optical signals into electrical signals, the light emitting devices 30 are configured to convert electric signals into optical signals and to emit light outward.

Figure 3:
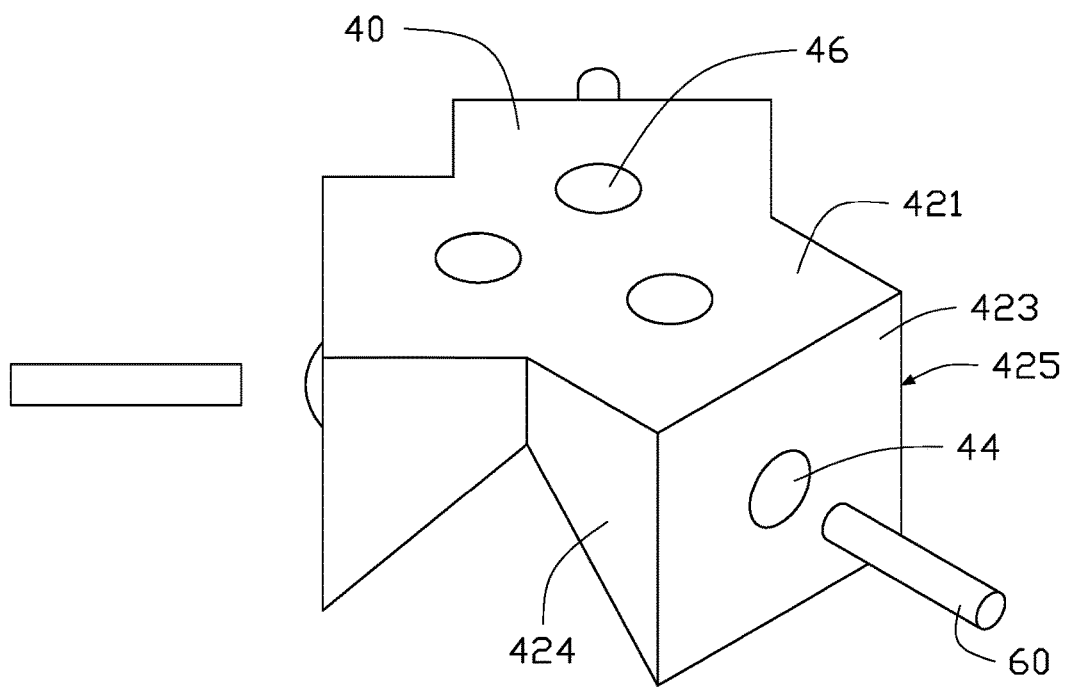
FIG. 3 is an isometric view of an optical coupling lens of the optical fiber coupling connector in FIG. 2.
Figure 4:
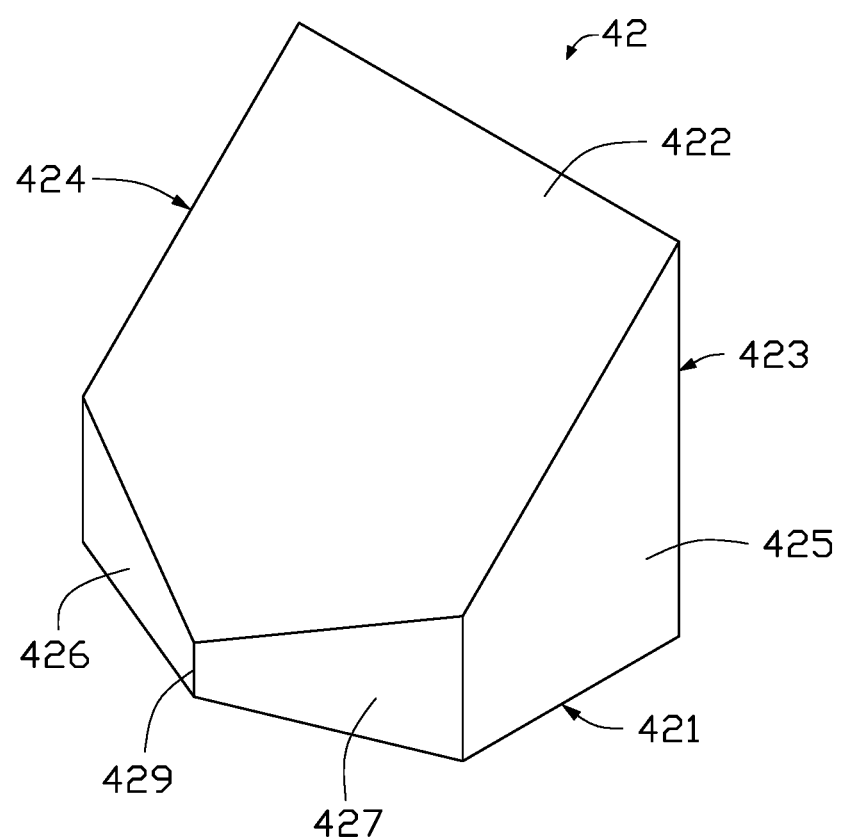
FIG. 4 is an isometric view of part of the optical coupling lens of the optical fiber coupling connector in FIG. 3.
Figure 5:
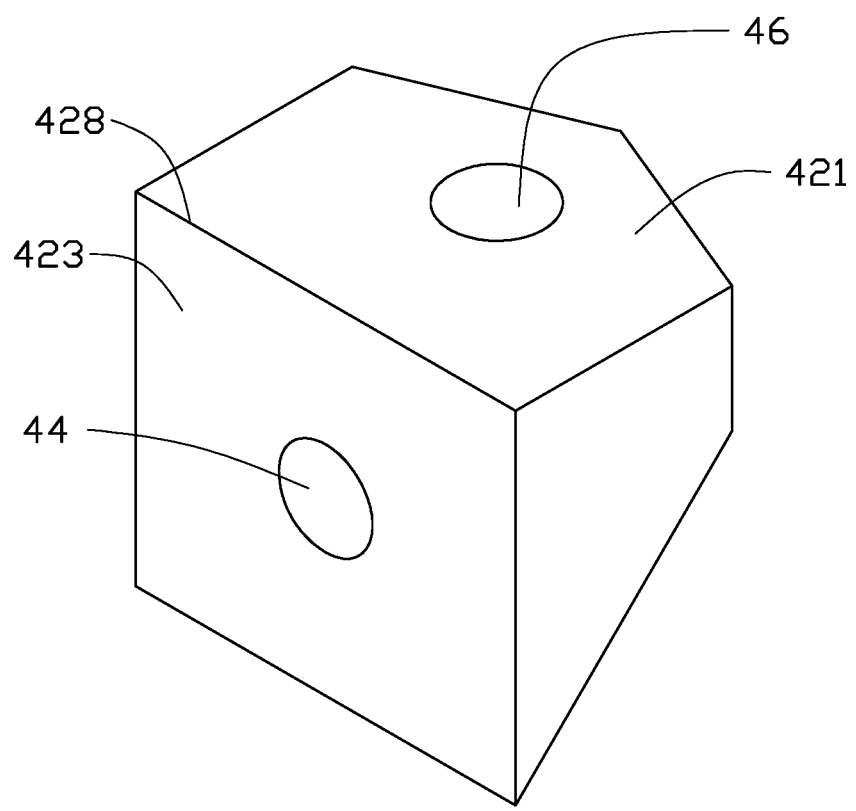
FIG. 5 is another isometric view of part of the optical coupling lens of the optical fiber coupling connector in FIG. 4.

FIGS. 3, 4, and 5 illustrate the embodiment of the optical coupling lens 40. The optical coupling lens 40 includes three main bodies 42, three first convergent areas 44, and three second convergent areas 46.

The main body 42 is a prism including a bottom surface 421, a top surface 422 opposite to the bottom surface 421, an alignment surface 423, a first side surface 424, a second side surface 425 opposite to the first side surface 424, a third side surface 426, and a fourth side surface 427. The bottom surface 421 and the top surface 422 are pentagons, the size of the bottom surface 421 is different from the top surface 422, the alignment surface 423 is a rectangle and is vertically connected to the bottom surface 421 at a first edge 428, the angle between the top surface 422 and the bottom surface 421 is 45 degrees, the angle between the top surface 422 and the alignment surface 423 is 45 degrees, the third side surface 426 and the fourth side surface 427 are right-angled trapezoid and the size of the third side surface 426 and the fourth side surface 427 are the same, the third side surface 426 is connected to the fourth side surface 427 at a second edge 429, and the angle between the third side surface 426 and the fourth side surface 427 is 120 degrees. The alignment surface 423, the first side surface 424, the second side surface 425, the third side surface 426, and the fourth side surface 427 are interconnected between the top surface 422 and the bottom surface 421. The first convergent area 44 is positioned on the alignment surface 423, the second convergent area 46 is positioned on the bottom surface 421 and corresponds to the first convergent area 44.

Three main bodies 42 connect to each other end to end, the third side surface 426 of one of the main bodies 42 correctly aligns with the fourth side surface 427 of another of the main bodies 42, three main bodies 42 are inseparable, and the bottom surfaces 421 of the main bodies 42 are flush with each other. When the optical coupling lens 40 is positioned on the board 10, the light receiving device 20 aligns with one of the second convergent areas 46, each of the light emitting devices 30 aligns with one of the other two corresponding second convergent areas 46, and each one of the three optical fibers 60 aligns with the first convergent areas 44. The optical coupling lens 40 can be fixed to the board 10 by adhesive.

The controller 50 is positioned on the first surface 12 of the board 10 and is configured to process the input electric signal from the light receiving device 20 and transmit the output electric signal into the light emitting devices 30.

Three optical fibers 60 are configured to input and output the optical signals.

When the optical fiber 60 receives the light with the optical signals in the first convergent area 44 and transmits the light through the alignment surface 423 and the first convergent area 44 into the optical coupling lens 40, the light is reflected by the top surface 422 to be converged on the light receiving device 20 that is positioned on the board 10 through the second convergent area 46 of the bottom surface 421. The light receiving device 20 converts the optical signals into the electrical signals and transmits the electric signals to the controller 50; the controller 50 processes the electrical signals and outputs the electric signals to the light emitting device 30. When the light emitting device 30 is enabled to emit light by the electrical signal, the light emitting device 30 converts the electric signals into optical signals and emits the light passing through the second convergent area 46 of the bottom surface 421. The light transmits through the optical coupling lens 40 and is reflected by the top surface 422. Finally, the light transmits to the optical fiber 60 within the first convergent area 44 and passes through the alignment surface 423.

The optical coupling lens is not limited to two light emitting devices 30, three first convergent areas 44, three second convergent areas 46, and three optical fibers 60, but can be changed according to the need as long as the sum of the number of the light emitting device 30 and the light receiving device 20 is corresponding to the numbers of the optical fibers 60. For example, four light emitting device 30 and two light receiving devices 20 correspond to six optical fibers 60.

The embodiments shown and described above are only examples. Many details are often found in the art such as the other features of an optical coupling lens.

Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber coupling connector, comprising:
   a board;
   a light receiving device;
   two light emitting devices;
   a controller, wherein the light receiving device, the light emitting devices and the controller are positioned on the board;
   an optical coupling lens positioned on the board the optical coupling lens comprising three main bodies, each main body comprising:
      a bottom surface;
      a top surface opposite to the bottom surface;
      a alignment surface;
      a first side surface;
      a second side surface;
      a third side surface obliquely connected to the first side surface; and
      a fourth side surface obliquely connected to the second side surface and connected to the third side surface at a second edge;
   wherein the alignment surface, the first side surface, the third side surface, the fourth side surface, and the second side surface are interconnected between the top surface and the bottom surface, and are connected to each other end to end in that order;
   wherein the three main bodies are connected to each other, such that the third side surface of each one of the main bodies contacts the fourth side surface of an adjacent one of the main bodies; and
   wherein at least three optical fibers positioned to the optical coupling lens.

2. The optical fiber coupling connector in accordance with claim 1, wherein the light receiving device is configured to receive optical signal and translates optical signal into electric signal, the light emitting devices are configured to translate electric signal into optical signal and emit optical signal, the controller is configured to process the electric signal from the light receiving device and transmit the electric signal into the light emitting devices.

3. The optical fiber coupling connector in accordance with claim 1, wherein the main body includes a first convergent area is positioned on the alignment surface and a second convergent area is positioned on the bottom surface, wherein the first convergent area and the second convergent area of each main body are optically coupled to each other through the top surface; wherein the first convergent area of one of the main bodies is configured to receive optical signals from a corresponding optical fiber, and the first convergent area of each of the other two main bodies is configured to transmit optical signals to a corresponding optical fiber; wherein the second convergent area of the one main body having the first convergent area configured to receive the optical signals is configured to transmit the optical signals to a corresponding light receiver, and the second convergent area of each of the other two main bodies is configured to receive optical signals from a corresponding light emitter; corresponds to the second convergent area; wherein the first convergent areas of the three main bodies do not lie on the same line; and wherein the second convergent areas of the three main bodies do not lie on the same line.

4. The optical fiber coupling connector in accordance with claim 3, wherein the light receiving device aligns with one of the second convergent area, the light emitting devices align with each others of the second convergent area, and each one of the optical fibers aligns with the first convergent areas.

5. The optical fiber coupling connector in accordance with claim 1, wherein an angle between the top surface and the bottom surface is 45 degrees, an angle between the top surface and the alignment surface is 45 degrees, and an angle between the third side surface and the fourth side surface is 120 degrees.

6. The optical fiber coupling connector in accordance with claim 1, wherein the main bodies are inseparable, and three bottom surfaces of the main body are flush with each other.

* * * * *